United States Patent
Adams

[19]

[11] Patent Number: 6,161,340
[45] Date of Patent: Dec. 19, 2000

[54] GOODS STORAGE AREA

[76] Inventor: William Mark Adams, Sutton Lodge, 33 Town Street, Sutton Cum Lound, Retford DN228PT, United Kingdom

[21] Appl. No.: 09/226,328

[22] Filed: Jan. 6, 1999

[30] Foreign Application Priority Data

Jan. 6, 1998 [GB] United Kingdom .................. 9800130

[51] Int. Cl.⁷ ....................................................... E04B 7/16
[52] U.S. Cl. .................................. 52/66; 52/67; 52/79.5; 296/181; 296/26.05
[58] Field of Search ................................. 52/66, 67, 79.5; 296/181, 26.02, 26.03, 26.04, 26.05, 100.05; 410/26.01, 129

[56] References Cited

U.S. PATENT DOCUMENTS

| | | | |
|---|---|---|---|
| 2,656,216 | 10/1953 | Bobroff ........................................ | 52/66 |
| 2,821,428 | 1/1958 | Webster ................................. | 296/26.05 |
| 2,990,214 | 6/1961 | Watson .................................. | 296/26.05 |
| 3,140,116 | 7/1964 | Speas ..................................... | 296/26.05 |
| 3,317,239 | 5/1967 | Tantlinger ..................................... | 52/66 |
| 3,528,698 | 9/1970 | Miller ............................................ | 52/66 |
| 3,694,024 | 9/1972 | Linville ................................. | 296/26.05 |
| 4,199,297 | 4/1980 | Abolins .................................... | 414/525 |
| 5,291,701 | 3/1994 | Delacollette et al. ...................... | 52/67 |

*Primary Examiner*—Carl D. Friedman
*Assistant Examiner*—Dennis L. Dorsey
*Attorney, Agent, or Firm*—Head, Johnson and Kachigian

[57] ABSTRACT

The invention relates to a goods storage area such as for use in transporting goods which are compressible and which can be loaded with the roof of the area, or possibly the floor, side or end walls of the same, in an extended position to define an area greater than the goods storage area. The compressible goods are loaded into the greater area defined and the roof, side wall or floor is returned to the closed position to compress the goods into the goods storage area. In order to allow sufficient strength for compression the invention provides for at least one intermediate support frame between the end walls and with means to cause the required movement between extended and closed positions to allow improved use of the storage area and strength of the goods storage area.

12 Claims, 3 Drawing Sheets

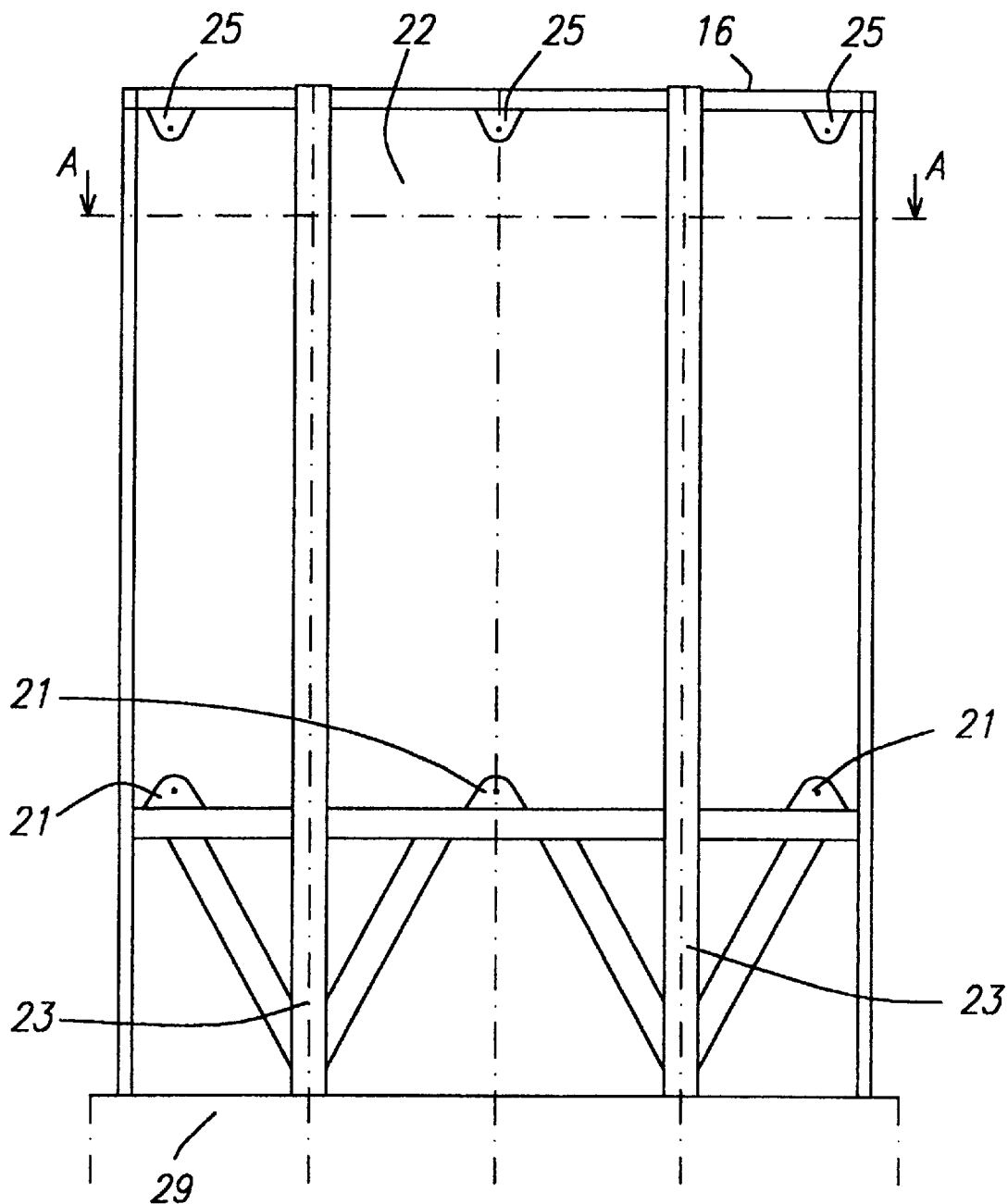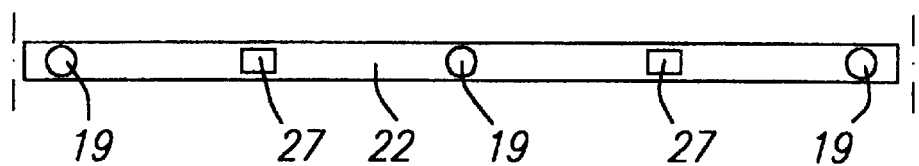

GOODS STORAGE AREA

CROSS-REFERENCE TO RELATED APPLICATIONS

This application claims priority to U.K. Application No. 9800130.8 filed Jan. 6, 1998.

The invention which is the subject of this application relates to a goods storage area such as the type which is transportable by vehicles and normally referred to as trailers and, in particular, to the type of storage area which has a roof section which is movable between a first, closed position in which the storage area is defined and a second, extended position for use when loading and unloading said goods.

This type of goods storage area is known and in particularly used for the transport of compressible goods wherein the goods can be loaded into the storage area with the roof in the second extended position and can be loaded to the height of the roof in this position. When loading is complete the roof section is then powered to be movable down onto the goods and returns to the first position to define the goods storage area for transport. As the roof moves it acts to compress the goods and this ensures effective use of the available storage space.

Conventionally this type of goods storage area is defined by two bulkheads at each end of the storage area, one fixed side wall at the offside of the vehicle between said side walls, a curtain sided side wall at the nearside of the vehicle, a floor and the movable roof. In order to move the roof, hydraulic rams are provided, with two fitted in each of the bulkheads and two further rams, one fitted at each side of the storage area, intermediate the bulkheads and fitted to the outside of the storage area or trailer. However a problem with this conventional arrangement is that the two intermediate hydraulic rams are required to perform the majority of the compressing action of the roof onto the goods when returning the roof to the first position, but, as the rams arc located at the extreme sides of the trailer, and hence the roof, it is impossible to provide the rams with the required strength and power without using relatively large and bulky ram assemblies. A further problem is that as the said intermediate rams are normally positioned at approximately the centre of the sides, it is difficult to ensure that the roof, when in a closed position is securely sealed to the side walls at what is, in practice, the weakest point of the seal. Furthermore, the fluid feed pipes to the hydraulic rams are required to be carried underneath the goods storage area, leaving them exposed and vulnerable to damage from the elements during use.

The aim of the present invention is to provide a goods storage area which allows for improved efficiency in the movement of the roof of the area between extended and closed positions and allows for improved compression of the goods and integrity of the goods storage area.

SUMMARY OF THE INVENTION

In a first aspect of the invention there is provided a goods storage area, said storage area formed by two spaced end walls and two side walls joining respective edges of the end walls, a floor and roof, at least one of the floor, side walls or roof movable with respect to the storage area between a first, closed, position substantially in line with the storage area and a second extended, position from the storage area and wherein there is provided at least one support frame in the storage area which is located intermediate the end walls.

Typically it is the roof which is movable with respect to the storage area between a first closed position in line with the top edges of the side walls and a second extended position from the side walls.

Typically either but preferably both, of the end walls are provided to act as bulkheads for the goods storage area which typically is a trailer or truck for a road vehicle or a railway wagon so that the storage area may be towable or mounted for transport.

In one embodiment the intermediate support frame or frames is/are provided in fixed location or locations relative to the goods storage area and said position can be determined in accordance with the goods to be stored and transported in said area so as to provide optimum use of the storage area. In one embodiment a number of support frames are provided at spaced intervals to compartmentalise the storage area and also provide the required strength and hence improved pull down by the rams on the roof at the required location in the goods storage area to compress the goods when the roof is in the lowered position. The support frame can in one preferred embodiment be mounted and located with the chassis of a goods storage trailer to provide the required strength for the movement means to act against when raising and lowering the roof. Furthermore, as the support frame provides the required strength, the rams need not be mounted directly on the floor of the trailer but can be attached to the support frame at a required height.

The support frame or frames preferably extends across the width of the goods storage area. In one embodiment the support frame is formed to act as a bulkhead.

Typically the roof is movable between first and second positions by means of hydraulic rams which are located with respect to the support frame and act to engage and move the roof between positions. In one preferred embodiment three rams are located in each support frame provided intermediate the end bulkheads with a further ram located in each of the end bulkheads. This ensures that the rams can be provided to be located with respect to the chassis of the storage area and therefore act to provide movement force at the required power and strength and at the required location. This is of particular importance when the goods are loaded into the goods storage area to a height defined by the roof at the second extended height and movement of the roof to the first closed position is required to compress the goods to the area defined by the roof in the closed position. Thus the strength of the goods storage area and particularly the roof and support frame and bulkheads is increased by the provision of the additional support frame. Furthermore, as the rams are not located at the edges of the roof, the roof can be more effectively sealed to the side walls when in a closed position.

Preferably the rams are located within each intermediate support frame provided and the same can be adapted to act as a bulkhead with relatively smooth outer walls so as not to cause damage to the goods stored in the area.

The reduction in the number of rams at the end walls means that the associated control equipment which is mounted at the end walls is reduced and hence can be accommodated on the outer surface of the end wall adjacent the vehicle thereby making available additional space within the goods storage area for the storage of goods.

Typically, at least one of the side walls is provided with a curtain side to allow the loading and unloading of the goods therefrom.

Reference hereonin to the roof being movable should not be interpreted to limit specific features to only being used when the roof is movable. It is envisaged that the support frame and the advantages and features associated therewith are of equal benefit if the side walls or floor were movable rather than the roof although it is movement of the roof which is preferred.

BRIEF DESCRIPTION OF THE DRAWINGS

Specific embodiments of the invention will now be described with reference to the accompanying drawings, wherein:

FIG. 3 illustrates an elevation of an intermediate support frame of the goods storage area; and FIG. 4 illustrates a plan view of a support frame of FIG. 3 along line A—A.

DETAILED DESCRIPTION OF PREFERRED EMBODIMENT

Figure 1:
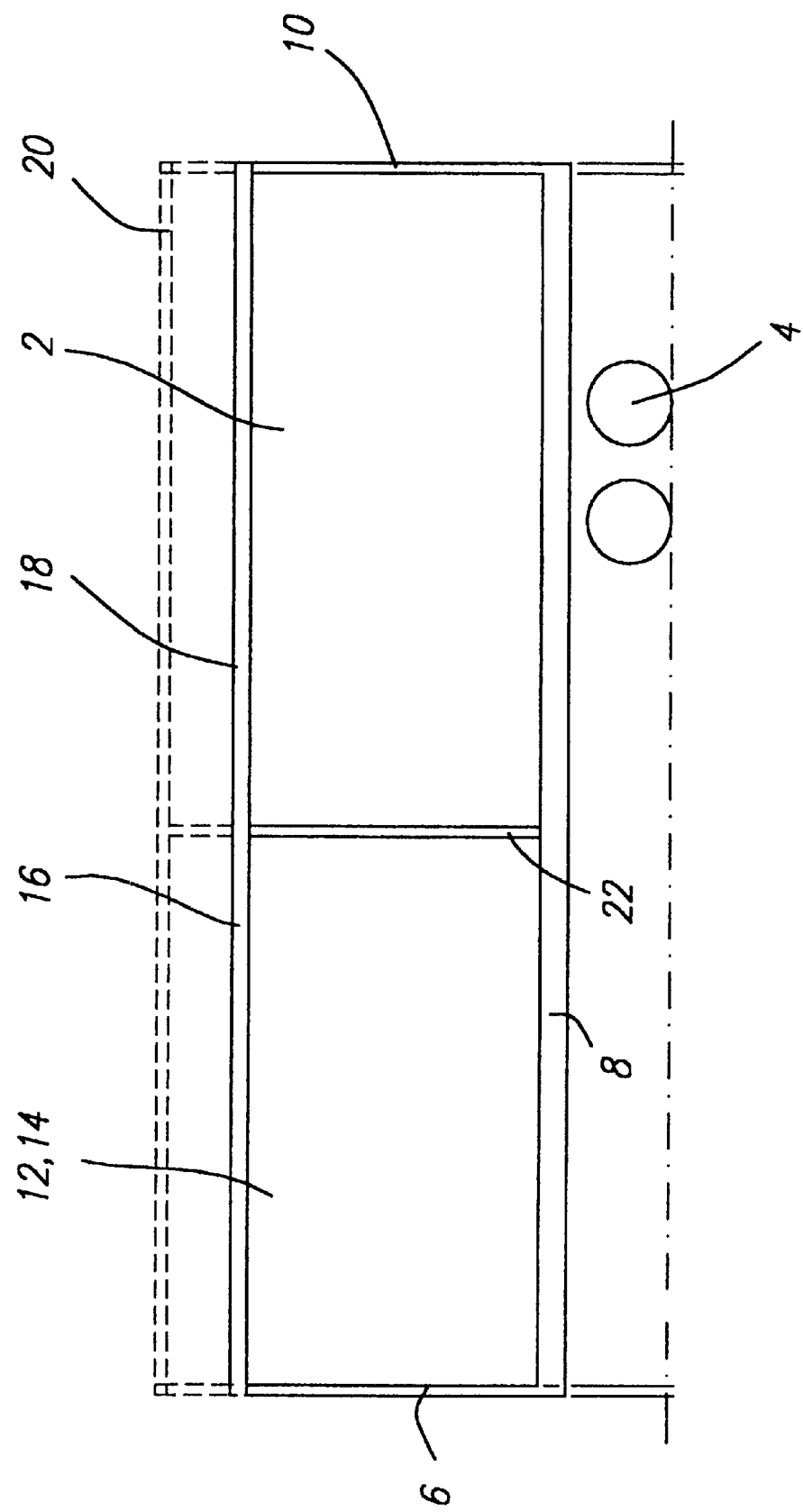
FIG. 1 illustrates a schematic elevation of a goods storage area according to one embodiment of the invention.

Referring firstly to FIG. 1 there is illustrated a goods storage area in the form of a vehicle trailer 2 from the side which is transported on wheels 4 and pulled by a vehicle (not shown) at end 6. The storage area is defined by a floor 8, end walls 6, 10, side walls 12, 14 and a roof 16. Typically one of the side walls 14 is solid and the other is formed with a curtain sided facility whereby the goods can be loaded and unloaded from the goods storage area at the side of same.

In the embodiment shown, the roof 16 is provided to be movable with respect to the side and end walls of the storage area between a first closed position as shown at 18 and a second, extended position 20 as shown in broken lines. The roof is moved between the positions by rams provided in engagement with the roof and fixed to the goods storage area. The end walls 6, 10 are provided to act as bulkheads and each includes one ram.

There is also provided a support frame 22 (hereinafter referred to synonymously as "intermediate bulkhead") located in a fixed position intermediate the end walls 6, 10 and as many intermediate support frames 22 as required can be provided with regard to the goods to be carried. The support frame 22, which is shown in more detail in FIGS. 3 and 4, and which is shown in a form to act as a bulkhead, can be attached to the floor and the solid side wall of the goods storage area and has three rams 19 shown in FIG. 4 which are fitted to extend between the location points 21 on the support frame and location points 25 on the roof 16 so as to exert the required movement force on the roof. The rams can be wholly enclosed within outer walls attached to the support frame to form the bulkhead and the walls are smooth so as to prevent damage to the goods. Thus the rams are mounted on location points 21 on the support frame which is fabricated and joined to the storage area chassis 29 at the base 23 and so the strength and integrity of the storage area is maintained even when moving the roof of the same via the rams. Furthermore, as the rams are positioned within the goods storage area and at a raised height from the floor, this enables the installation and servicing of the rams and associated control and supply components to be improved and located under the rams in the support frame. Guide means 27 can also be incorporated in the support frame to allow guidance of the roof between the first and second positions and prevent jamming of the movement of the roof.

Figure 2:
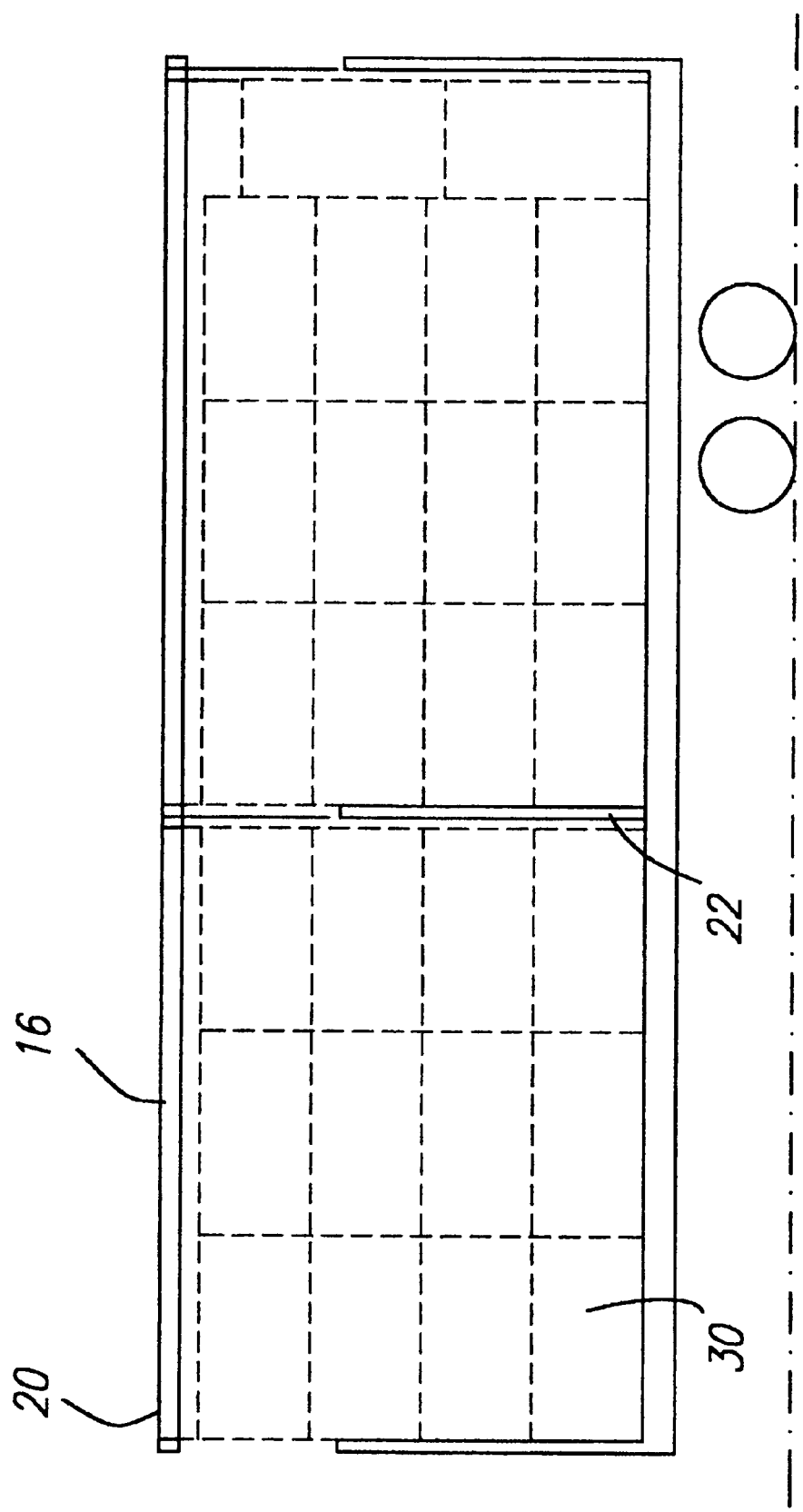
FIG. 2 illustrates the goods storage area of FIG. 1 with the roof raised and goods in position.

In use, the goods storage area of FIG. 1 is required to receive the goods to be carried which in one instance are compressible foam blocks. The roof 16 is therefore powered to raise to the second extended position by operation of the hydraulic rams to the position shown in FIG. 2. With the curtain side wall 12 open, the foam blocks 30 are loaded into the goods storage area to the height defined by the roof 16 in the extended position 20 as shown in FIG. 2. It will also be readily appreciated that the support frame 22 is positioned along the length of the storage area with respect to the size of the goods to be stored so that the maximum use of the storage space can be obtained, and if required additional intermediate support frames can be provided.

With the foam blocks 30 in position the roof 16 is then powered downwardly towards the first closed position by the hydraulic rams. As the roof is moved it contacts with the foam blocks to exert a compressing force on the same. As the foam is compressible it yields to the force applied thereon and so the roof returns to the first closed position at which point it is sealed to the side and end walls and the goods storage area is ready for transport.

When unloading the goods, the roof is again raised, the curtain side wall 12 is opened and the goods can be removed in a conventional manner.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A goods storage area which comprises:

two spaced end walls, side walls joining respective edges of the end walls, a floor and roof, said roof movable between a first extended position above the tops of the spaced end walls to allow loading of said goods up to the level of the roof in the extended position, and a second, lowered position level with the tops of the spaced end walls, and the action of moving the roof from the extended position to the lowered position compresses the said goods into the storage area defined by the end walls, side walls, floor and roof in the lowered position and wherein there is provided at least one intermediate bulkhead which extends across the width of the storage area and which intermediate bulkhead is located intermediate the end walls and wherein a movement means is positioned within the intermediate bulkhead and spaced inwardly of the side walls to extend upwardly from the intermediate bulkhead to move the roof to the said first extended position and retract to the intermediate bulkhead to move said roof to the second lowered position, and said movement means acts in conjunction with movement means located at the end walls of said goods trailer.

2. A goods storage area according to claim 1 including a top edge of each said side wall and wherein the roof is movable with respect to the side walls between a first, closed position in line with the top edges of the side walls and a second extended position from the side walls.

3. A goods storage area according to claim 1 wherein said at least one intermediate bulkhead is provided in a fixed location relative to the goods storage area and said position is determined in accordance with the goods to be stored and transported in said area so as to allow optimum use of the storage area.

4. A goods storage area according to claim 1 wherein a plurality of intermediate bulkheads are located intermediate the end walls.

5. A goods storage area according to claim 1 wherein said at least one intermediate bulkhead is mounted and located on a transportable chassis of a goods storage area.

6. A goods storage area according to claim 1 Wherein said at least one intermediate bulkhead includes mounted thereon or supports at least one hydraulic ram connected between said bulkhead and the roof of the goods storage area to move the roof between the closed and extended positions.

7. A goods support area according to claim 6 wherein a plurality of hydraulic rams are mounted and/or supported by the at least one intermediate bulkhead.

8. A goods storage area according to claim 1 wherein the roof is movable between first and second positions by means of hydraulic rams which are located with respect to the end walls and the at least one intermediate bulkhead which act to engage and move the roof between the said positions.

9. A goods storage area according to claim 1 wherein the intermediate bulkhead includes guide means which allow the guidance of the roof between the first and second positions.

10. A goods storage area according to claim 1 wherein said movement means are hydraulic rams which are mounted to at least one intermediate bulkhead so as to provide relatively smooth side walls so as to reduce risk of damage to goods stored in the area.

11. A transportable storage device which comprises:
   a trailer having a pair of spaced end walls, a pair of side walls, and a floor;
   compressible goods loadable in said trailer;
   a roof for said trailer having an intermediate bulkhead located between said end walls; wherein said intermediate bulkhead includes movement means to raise and lower said roof; and
   wherein said roof is moveable between a raised position to allow loading of said goods and a lowered position to compress said goods.

12. A transportable storage device as set forth in claim 11 wherein said roof is moveable between said raised position to allow loading of said goods and the lowered position to compress said goods by a plurality of hydraulic rams.

* * * * *